United States Patent [19]
Lance

[11] Patent Number: 5,931,533
[45] Date of Patent: Aug. 3, 1999

[54] SEAT HEIGHT ADJUSTMENT

[75] Inventor: Mark Lance, Williamstown, Australia

[73] Assignee: Henderson's Industries Pty. Ltd., Australia

[21] Appl. No.: 08/836,459

[22] PCT Filed: Dec. 1, 1995

[86] PCT No.: PCT/AU95/00802

§ 371 Date: May 14, 1997

§ 102(e) Date: May 14, 1997

[87] PCT Pub. No.: WO96/16832

PCT Pub. Date: Jun. 6, 1996

[30] Foreign Application Priority Data

Dec. 2, 1994 [AU] Australia ............................... PM 9853

[51] Int. Cl.[6] .................................................. A47C 1/02
[52] U.S. Cl. ................................ 297/344.18; 297/344.1; 297/325; 248/404; 248/396
[58] Field of Search .............................. 297/344.1, 344.12, 297/344.13, 344.18, 344.2, 337, 338, 339, 325, 330, 312; 248/404, 162.1, 161, 396, 371, 429

[56] References Cited

U.S. PATENT DOCUMENTS

| | | | |
|---|---|---|---|
| 1,526,920 | 2/1925 | Liptak | 297/344.18 X |
| 2,615,499 | 10/1952 | Wallace | 297/344.12 X |
| 3,090,647 | 5/1963 | Moore | 297/344.13 X |
| 4,029,283 | 6/1977 | Swenson et al. | |
| 4,103,858 | 8/1978 | Swenson | |
| 4,461,444 | 7/1984 | Grassl et al. | 297/339 X |
| 4,787,593 | 11/1988 | Pipon et al. | 297/344.13 X |
| 5,462,337 | 10/1995 | Yamakami | 297/344.13 |

FOREIGN PATENT DOCUMENTS

| | | |
|---|---|---|
| 39264 | 8/1973 | Australia . |
| 24 19 988 | 11/1975 | Germany . |

Primary Examiner—Milton Nelson, Jr.
Attorney, Agent, or Firm—Lerner, David, Littenberg, Krumholz & Mentlik, LLP

[57] ABSTRACT

A seat height adjustment system particularly adapted for use with vehicle seats and which permits the elevation of one side of the seat base to be adjusted relative to the elevation of an opposite side of that base. The system employs spring assemblies to provide an upwardly directed bias on the seat base which urges that base towards a position of maximum elevation. An actuator is operable to effect downward adjustment of the seat base elevation by imposing a force on the seat base which acts counter to the bias force. Actuator may include two electric motors each of which is connected to a respective two corners of the seat base through flexible drive cables. The arrangement is such that the seat base corners controlled by a respective one of the motors move up or down according to whether the motor is operated in a forward or a reverse mode respectively.

24 Claims, 7 Drawing Sheets

SEAT HEIGHT ADJUSTMENT

FIELD OF THE INVENTION

This invention relates to seats and is particularly although not exclusively concerned with seats as used in vehicles, which may be land vehicles or air or water borne vehicles. The invention is concerned with the adjustment of the seat height to suit the convenience or comfort of the user. It will be convenient to hereinafter describe the invention with reference to vehicle seats, but that is not the only application of the invention.

BACKGROUND OF THE INVENTION

Various means have been adopted to permit adjustment of the height or elevation of the seating surface of a vehicle seat. Such adjustment means is generally arranged to operate between the vehicle floor and the seat base or pan on which the seat cushion is supported, and in most cases is either mechanically or electrically actuated. It is also usual for such adjustment systems to be complex and to require substantial space for location of the various components. A particular difficulty exists with those systems which encroach into the area between tracks on which the seat is mounted to permit fore and aft adjustment of the seat location.

It is an object of the present invention to provide a seat height adjustment system which is relatively simple and has minimum space requirements. It is an object of the invention in a preferred form to provide such a system which is electrically actuated.

SUMMARY OF THE INVENTION

A seat height adjustment system according to the invention is characterized in that the seat is resiliently biased towards a position of maximum elevation, and pull-down means is operable to move or allow movement of the seat against the influence of the biasing means towards a position corresponding to a position of minimum elevation of the seat. In a preferred arrangement, the biasing means includes a plurality of springs which act between the seat base and a support so as to normally urge the seat base away from the support towards a position of maximum separation which corresponds to the aforementioned position of maximum elevation of the seat. By way of example, one such spring may be located at or adjacent each of the four corners of the seat base.

The positions of maximum and minimum elevation referred to above and in subsequent passages of this specification assumes that there is consistent raising or lowering of the seat at all sides during adjustment of the elevation of the seat. That is, any adjustment of the seat will be a general adjustment as distinct from relative adjustment between different sides of the seat. Provision may be made to allow adjustment of the relative elevations of the front and the rear of the seat respectively, by way of example, and in that case the absolute maximum and minimum elevations of the front of the seat will correspond to the absolute minimum and maximum elevations respectively of the rear of the seat. Those absolute maximum and minimum elevations may be above and below respectively the maximum and minimum elevations of the seat in general which are achieved when there is no variation in the relative elevations of opposite sides of the seat.

It is preferred that means is provided to guide the seat during movement between the positions of maximum and minimum elevation. Such guide means may be telescopic in nature and may be associated with the biasing means. With regard to the last point the guide means and the biasing means may be combined to form a single assembly, an example of which is hereinafter referred to as a spring assembly.

The pull-down means may be mechanically or electrically actuated, but is electrically actuated in a preferred arrangement. It is further preferred that the or each actuator is operatively connectable to the seat base or to a member which influences the position of the seat base, and that connection may be through at least one flexible cable. The actuator cable need not act directly on the seat base. It could act on a member which is connected to or associated with the seat base in such a way that the position of that member relative to the spring support regulates the degree of separation between the seat base and the support when the seat is occupied.

According to one arrangement, the pull-down means includes two electrically powered actuators in the form of motors which are connected to the front and the rear of the seat base respectively. Preferably, one actuator is connected to each of two opposite sides of the base at locations adjacent the front of the base, and the other actuator is connected to each of those sides at locations adjacent the rear of the base. The two actuators can be mounted at any convenient location on or adjacent the seat, and need not be movable with the seat base since the flexibility of the cable connection will compensate for changes in relative positions.

In some seat installations the seat is mounted on two parallel slide tracks or rails so that the position of the seat can be shifted forwardly or rearwardly. In such a case, it is preferred that each of the biasing springs previously referred to forms part of a respective spring assembly, and that each of those assemblies is mounted on the track or slide system whereby the seat is movable fore and aft relative to the body of the vehicle with which the seat is associated. That is, each spring assembly is mounted on the track or slide system so as to move forwards or rearwards with the seat whenever fore or aft adjustment of the seat position is effected.

BRIEF DESCRIPTION OF THE DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings.

DETAILED DESCRIPTION

Figure 1:
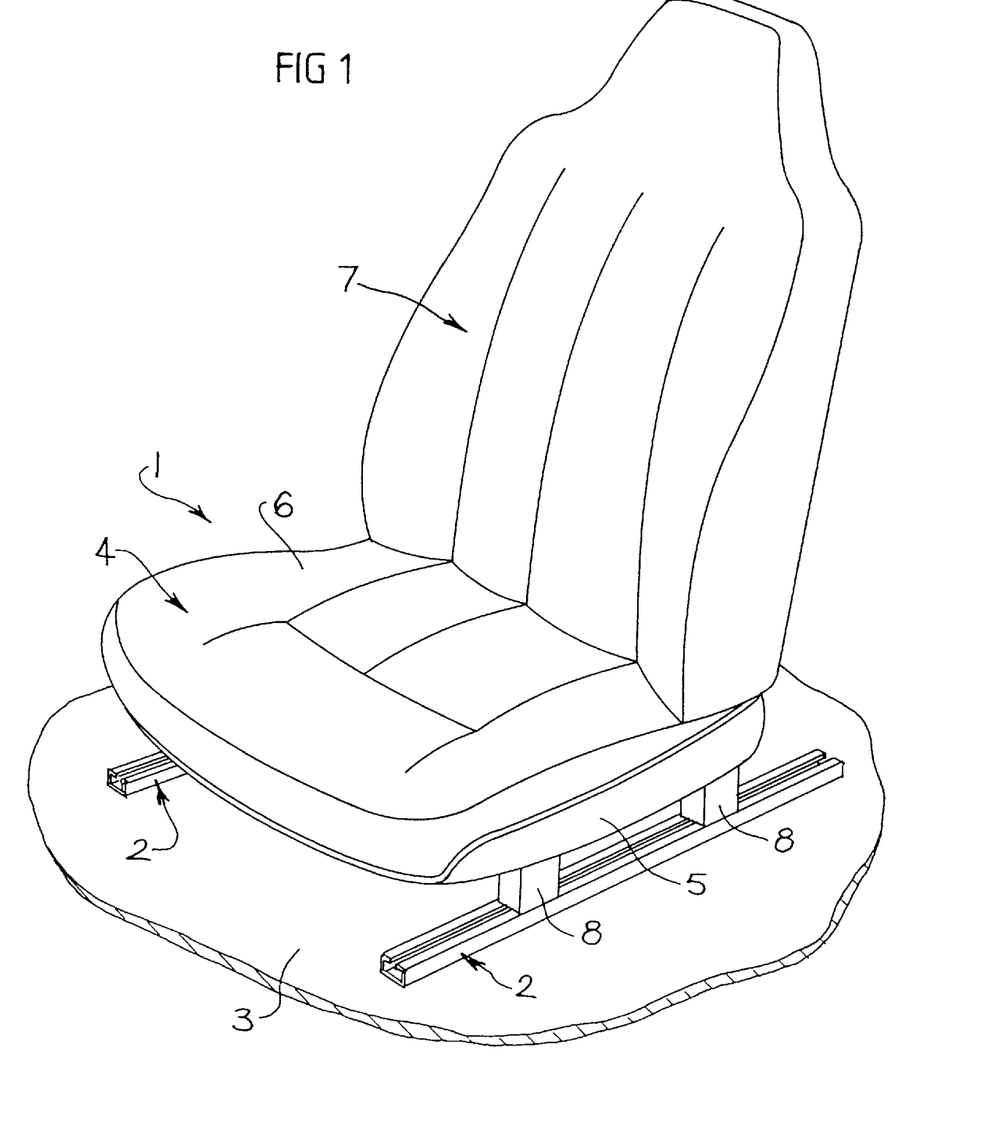
FIG. 1 is a semi-diagrammatic perspective view of a vehicle seat mounted on slide rails to permit fore and aft adjustment of the seat position.

FIG. 1 shows in semi-diagrammatic form a typical vehicle seat 1 mounted on rails 2 secured to the vehicle floor 3 and which enable the seat position to be adjusted fore and aft. The seat 1 comprises a base 4 which includes a relatively rigid pan 5 and resilient cushioning 6 mounted on that pan. A backrest 7 is attached to the base 4, usually in a manner such as to permit adjustment of the rearward slope of the backrest 7. The pan 4 is mounted on the rails 2 through slides 8 which co-operate with the rails 2 as required to enable the aforementioned fore and aft adjustment.

Figure 2:
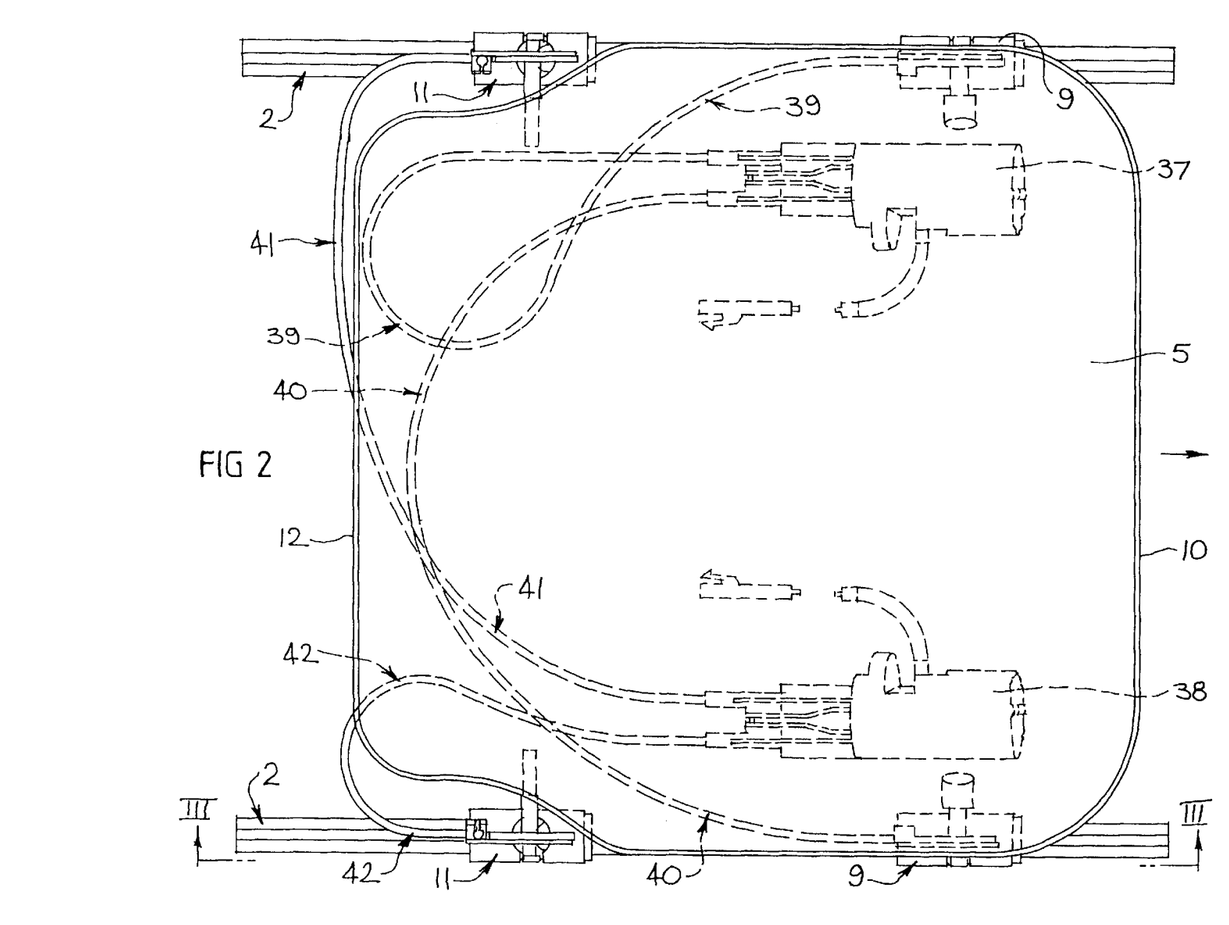
FIG. 2 is a plan view of the base of a seat as shown in FIG. 1 and the elevation of which is controlled by an adjustment system in accordance with one embodiment of the invention.
Figure 3:
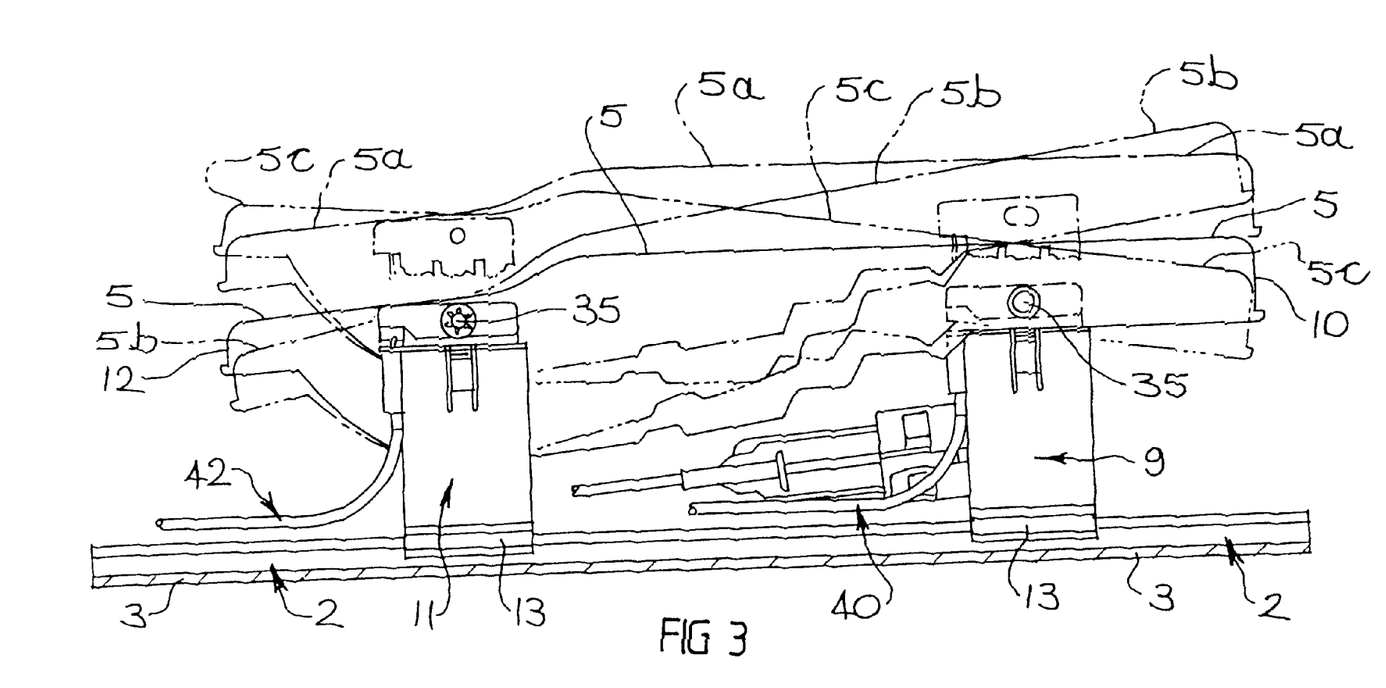
FIG. 3 is a side elevation view of the arrangement shown by FIG. 2 and which is shown on a reduced scale.

FIG. 2 shows an example arrangement according to the invention, and in particular shows in plan view the seat pan 5 mounted on two slide rails 2 which are secured to the vehicle floor 3 (FIG. 3). The seat pan 5 is mounted on each of the rails 2 by way of a front spring assembly 9 located adjacent the front side 10 of the pan 5, and a rear spring assembly 11 located adjacent the rear side 12 of the pan 5. That is, a set of front and rear spring assemblies 9 and 11 is provided on each of two opposite sides of the pan 5. Each spring assembly 9 and 11 has a slide member 13 at its lower end which co-operates with the associated rail 2 in a manner such as to permit fore and aft movement of the associated assembly 9 or 11 along the rail 2. It is to be understood that the form of each slide member 13 will be determined according to the form of the rails 2 with which the seat is used.

Figure 4:
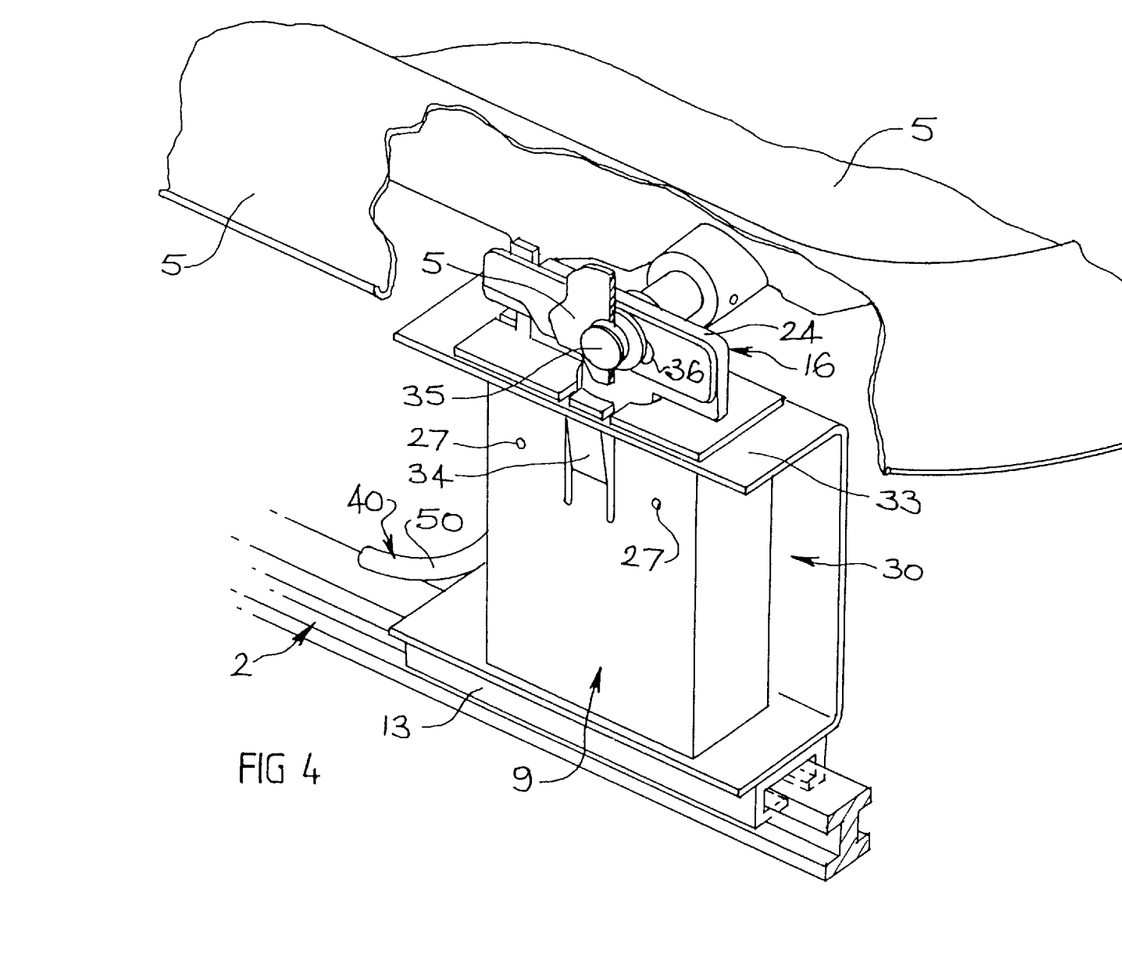
FIG. 4 is a perspective view of a spring assembly of the adjustment system shown by FIG. 3.
Figure 5:
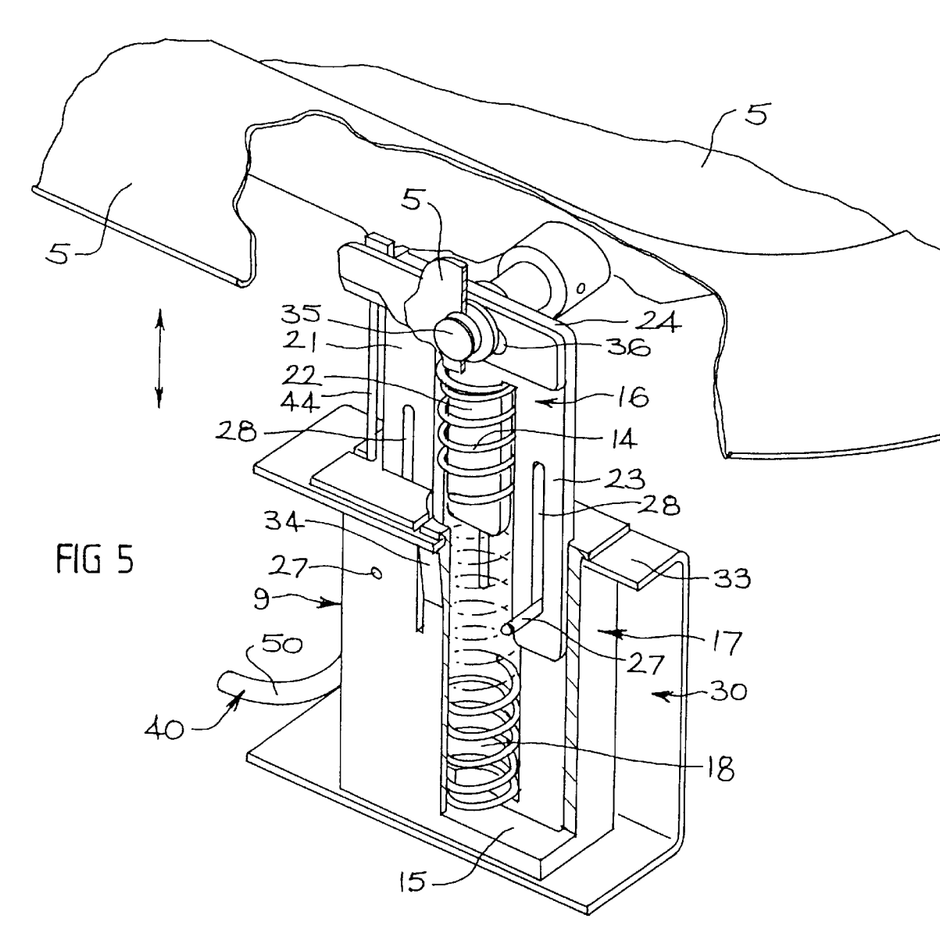
FIG. 5 is a view similar to FIG. 4 but showing the spring assembly extended to place the seat base at a position of greater elevation.

One of the spring assemblies 9 is shown in FIGS. 4 and 5, but it is to be understood that the detail of that assembly may vary from what is shown by those figures. FIG. 4 shows the spring assembly 9 in its contracted condition which corresponds to a position of minimum separation between the floor 3 and the seat pan 5, and FIG. 5 shows the assembly 9 in its extended condition which corresponds to a position of maximum separation between the floor 3 and the seat pan 5. In each case, the position of minimum or maximum separation is the relative position of the particular part of the seat pan 5 which is controlled by the relevant assembly 9. Nevertheless, it will usually be the case that the two front corners of the pan 5 are adjusted simultaneously and in a consistent manner. Similarly, the two rear corners of the pan 5 will usually move together and in the same direction and to the same extent. On the other hand, independent adjustment of the front and rear corners respectively will be permitted in the particular arrangement shown so that the degree of elevation of the seat pan 5 may be different at the front and rear respectively of that pan.

It is also envisaged that either lateral side of the pan 5 can be adjusted relative to the other opposite lateral side and thereby achieve lateral tilting of the pan 5. Such an effect might be of benefit during cornering of the associated vehicle and could be achieved by adjusting one pair of assemblies 9 and 11 relative to the other pair of assemblies 9 and 11.

The purpose of each spring assembly 9 or 11 is to impose an upward bias on the seat pan 5 so as to normally urge that pan towards a position of maximum elevation. Any suitable arrangement could be adopted for that purpose, and one example arrangement is shown in FIG. 5. In that example arrangement, the assembly 9 includes a coil compression spring 14 which acts between a base 15 of the assembly 9 and a member 16 which is movable relative to the base 15 and is connected to the seat pan 5. The base 15 is shown as forming part of a spring container 17, but that is not essential. The example container 17 as shown has a cylindrical cavity 18 which contains at least part of the spring 14 and at least assists in maintaining the spring 14 in the position and configuration necessary for the spring to operate as required.

Figure 6:
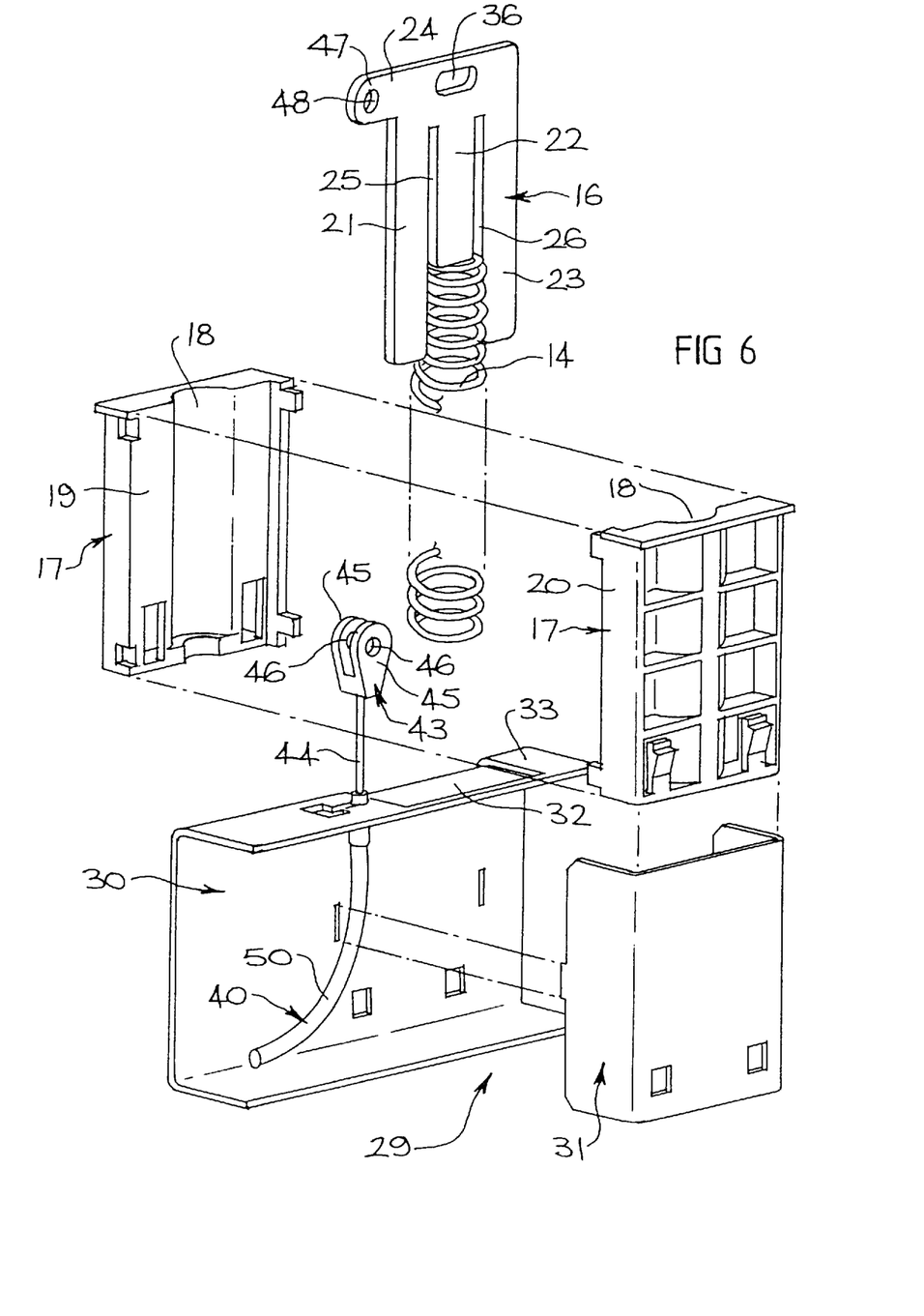
FIG. 6 is an exploded view of the spring assembly of FIGS. 4 and 5.

As best seen in the exploded view forming FIG. 6, the container 17 may be composed of two separable sections 19 and 20, each of which forms a respective half of the cavity 18. The sections 19 and 20 could be formed of a plastics material or any other suitable material.

The member 16 may be of any suitable form, but in the arrangement shown it is of plate-like form and includes three laterally spaced legs 21, 22 and 23 which depend downwardly from a cross-bar or head 24 of the member 16. The arrangement is such that slots 25 and 26 formed on respective opposite sides of the central leg 22, and those slots are dimensioned to permit the central leg 22 to locate within the spring 14 as shown in FIG. 5. Each of the outer legs 21 and 23 is thereby located outside the spring 14 so as to extend generally in the axial direction of the spring 14.

In the particular arrangement shown, each arm 21 and 23 is slidably located within a passage of substantially complementary cross-sectional shape provided within the spring container 16, and thereby at least assists in guiding the movement of the pan 5 during adjustment of the elevation of the pan 5. Any suitable means may be provided to limit the extent of that movement, and in the arrangement shown that limiting means includes two retaining pins 27, each of which is slidably located in a slot 28 formed in a respective one of the arms 21 and 23 (FIG. 5).

Any suitable means may be adopted for holding the two container sections 19 and 20 against separation. In the arrangement shown the sections 19 and 20 are located within a housing 29 (FIG. 6) which forms at least part of the means which resists separation of those sections. As shown, the housing 29 may include two channel sections 30 and 31 which co-operate to closely confine the container 17. An opening 32 (FIG. 6) may be formed in a top wall 33 of the housing 29 to permit the container 17 to be moved into and out of the housing 29, and any suitable retaining means could be adopted to releasably hold the container 17 within the housing 29. In the example shown in FIG. 5, a resiliently mounted detent 34 forms at least part of such retaining means.

It is preferred that the channel sections 30 and 31 of the housing 29 are formed of metal and are sufficiently strong to provide protection for the spring container 17 in the event of an accident.

In the installed condition of the spring assembly 9 (or 11) the spring engaging member 16 is connected to the seat pan 5 so that movement of the member 16 towards and away from the assembly base 15 causes a change in the elevation of the pan 5 relative to the vehicle floor 3. That connection may be effected in any suitable manner, and an example form of connection is shown by FIGS. 4 to 7. According to that example, a pin 35 extends through an opening 36 formed through the head 24 of the member 16 and is attached to the pan 5 in any suitable fashion. The pin 35 is arranged so that its longitudinal axis extends transverse to both the longitudinal axis of the spring 14 and the longitudinal axis of the adjacent slide rail 2. In particular, it is preferred that the pin 35 provides a pivot axis about which the pan 5 may swing when the elevation of the front or the rear of the pan is being adjusted relative to the rear or the front respectively. For that purpose, it is desirable that the pins 35 on opposite sides of the pan 5 are substantially coaxial.

Figure 7:
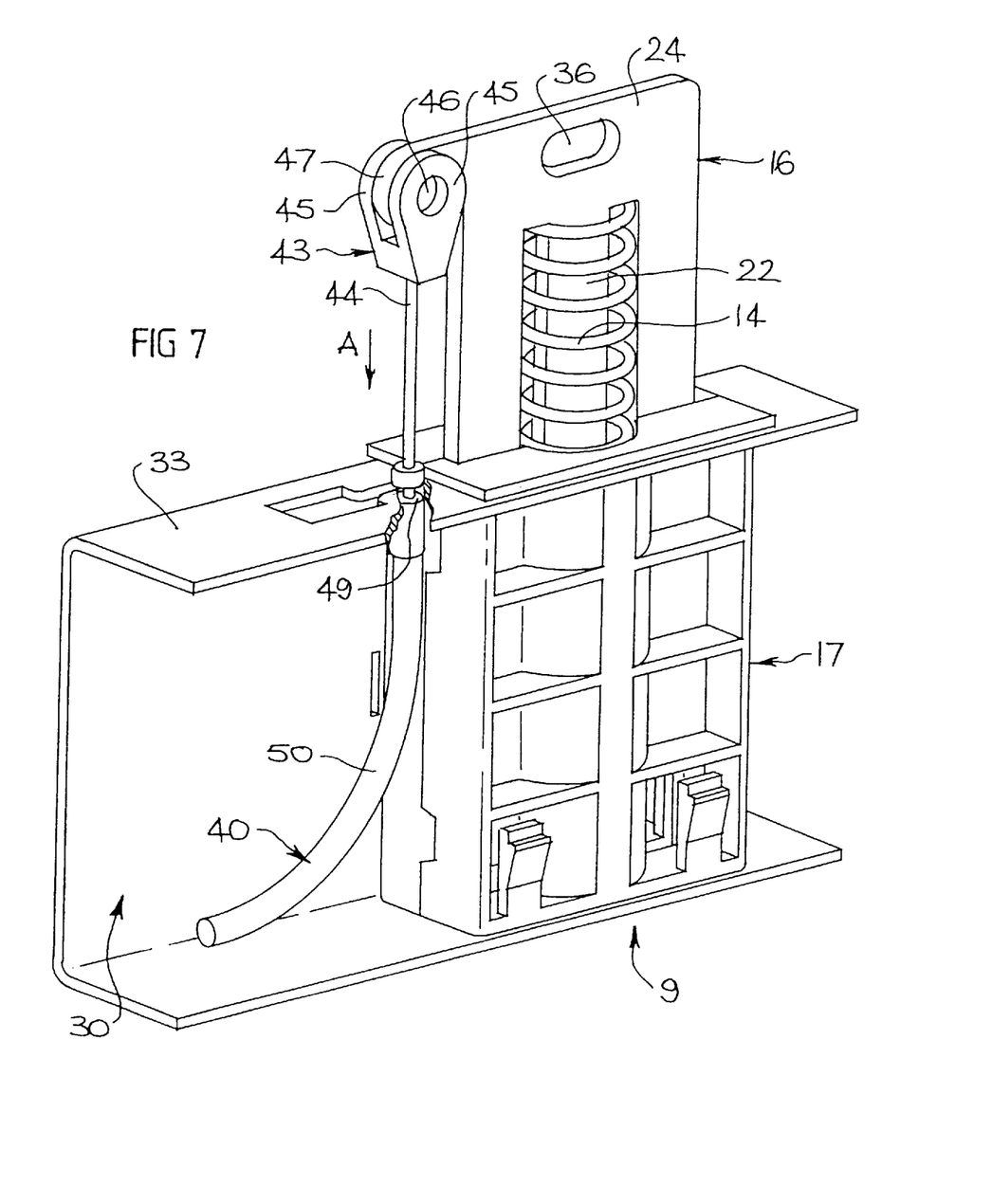
FIG. 7 is a view similar to FIG. 5 but showing other parts of the spring assembly as shown in FIG. 6.

Although the preceding description has been primarily directed to the construction of one of the front spring assemblies 9, it is to be understood that each of the rear assemblies 11 could be of the same, or substantially the same, construction. The front and rear assemblies 9 and 11 could differ in respect of the connection with the pivot pin 35. By way of example, the opening 36 of each assembly 9 may be in the form of a slot as best seen in FIGS. 6 and 7, whereas a circular hole may form the corresponding opening of each assembly 11. That difference in opening configuration enables the pan 5 to shift forward or rearward relative to the assemblies 9 while the pan 5 is pivoting about the pins 35 of the assemblies 11. It will be evident that the slots could be associated with the assemblies 11 rather than the assemblies 9. Also, other means could be adopted to compensate for the forward or rearward shift of the pan 5 when it is pivoting about one pair of the pins 35.

The movable member 16 and the spring container 17 of each spring assembly 9 and 11 co-operate to in effect form a telescopic mounting for the seat pan 5. In particular, because of the connection between the member 16 and the pan 5, sliding movement of the member 16 relative to the container 17 results in a change in the elevation of that part of the pan 5 to which the member 16 is connected. The associated spring 14 biases the mounting 16, 17 so that it is normally urged to adopt a condition of maximum extension, and for that purpose it is generally convenient to arrange the spring 14 and the mounting 16, 17 in a single assembly as shown. It is to be understood however, that the basic functional requirements could be achieved with the spring or other biasing means arranged independent of or separate from the telescopic mounting or any functional equivalent of such a mounting.

Any suitable pull-down means may be employed to draw the seat pan 5 downwards against the influence of the spring assemblies 9 and 11. In the preferred arrangement shown that pull-down means is electrically powered, and separate pull-down means is associated with the front assemblies 9 and the rear assemblies 11 respectively. Each such separate pull-down means may include an electric motor and drive means which connects the motor to each of the spring assemblies to be influenced by that motor.

An example pull-down arrangement is shown in FIG. 2, in which an electric motor 37 is connected to each of the spring assemblies 9, and an electric motor 38 is connected to each of the spring assemblies 11. In each case the connection is preferably effected through a flexible cable, and that type of connection will be hereinafter described. It is to be understood however, that other types of connection could be adopted. In the arrangement shown the motor 37 is connected to each of the spring assemblies 9 through respective cables 39 and 40, and the motor 38 is connected to each of the spring assemblies 11 through respective cables 41 and 42.

Each cable 39, 40, 41 and 42 preferably comprises a flexible wire core and a tubular covering which slidably receives and protects the core. FIGS. 6 and 7 show an example form of attachment between one end of the cable 40 and one of the spring assemblies 9. The same form of attachment could be adopted for each of the other cables 39, 41 and 42. The attachment includes a clevis-type bracket 43 secured to the terminal end of the core 44 of the cable 40. Opposed and spaced plates 45 of that bracket 43 have coaxial holes 46 formed therethrough for receiving an attaching pin (not shown). An extension 47 of the head 24 of the member 16 is locatable between the plates 45 and has a hole 48 for receiving the aforementioned attaching pin.

As best seen in FIG. 7, an end 49 of the cable cover 50 abuts against the undersurface of the housing top wall 33. It is therefore possible to draw the core 44 into the cover 50 in the direction of arrow A and thereby pull the member 16 downwards against the influence of the spring 14. The opposite end of the core 44 can be connected to the motor 37 in any appropriate manner to enable the core 44 to be drawn in the direction of arrow A when the motor is operated in say a forward mode. That connection should also be such that when the motor 37 is operated in the reverse mode the spring 14 can exert its influence to push the member 16 upwards and thereby move the core 44 in the direction opposite to the arrow A.

The particular arrangement shown in the drawings enables a wide range of adjustments of the seat elevation. The position of the seat pan 5 as shown in full line in FIG. 3 is the position of minimum elevation when the spring assemblies 9 and 10 at the front and rear of the pan respectively are each fully contracted. Three other positions of the seat pan are shown in broken line and they are identified by the references 5a, 5b and 5c respectively. Position 5a is the position of elevation achieved when the spring assemblies 9 and 11 at the front and rear respectively of the seat pan 5 are at their positions of maximum extension and is therefore the position of maximum elevation (in general terms) of the seat pan 5. Position 5a and the position shown in full line in FIG. 3 are therefore in a sense two extremes of the range of seat positions available. Infinite variation between those extremes is possible.

Position 5b is achieved when the front spring assemblies 9 are fully extended and the rear spring assemblies 11 are fully contracted, and is therefore the position of absolute maximum elevation of the front side of the pan 5. Position 5c is achieved when the front spring assemblies 9 are fully contracted and the rear spring assemblies 11 are fully extended, and is therefore the position of absolute maximum elevation and absolute minimum elevation of the rear and front sides respectively of the pan 5.

In a preferred application of the arrangement particularly described the springs 14 will be selected to impose an upward force on the pan 5 which is greater than the downward force imposed on the pan by the load of the seat occupant under normal conditions of use. By way of example, the upward force might be approximately double the expected maximum downward force. The aim is to ensure that the seat will retain a selected position of elevation during normal use. Since adjustment of the seat elevation will usually occur while the seat is occupied, the downward force imposed on the seat by the seat occupant reduces the effort required by the pull-down means to lower the seat elevation generally or selectively at the back or at the front.

It will be apparent from the foregoing that the invention provides a relatively simple yet effective system for controlling and adjusting the elevation of a seat. The use of electric motors with flexible cable connections to height control devices located at or adjacent the perimeter of the seat, enables the system to be installed with little or no intrusion into the space beneath the seat. In particular, the space between the slide rails of seat arrangements in which fore and aft adjustment of the seat position is provided for, will remain relatively uncluttered.

The embodiment of the invention particularly described enables relative adjustment of the front and rear sides of the seat base, but as previously indicated it is possible to arrange the seat height adjustment system of the invention to enable relative adjustment of the lateral sides of the seat base. By way of example, the arrangement particularly described could be modified for that purpose by providing a separate drive motor for each of the four drive cables.

Various alterations, modifications and/or additions may be introduced into the construction and arrangement of parts previously described without departing from the spirit or ambit of the invention as defined by the appended claims.

I claim:

1. A seat height adjustment system including, a support, a seat base, mounting means mounting said base on said support to permit movement of the base away from and towards the support, biasing means urging said base away from said support towards a raised position of elevation, and height adjusting means drivably connected to said base and operable to move said base towards said support against the action of said biasing means so that said base adopts a position of elevation below said raised position, said height adjusting means being operative to hold said base against movement away from said support beyond a selected position of elevation, said height adjusting means including an actuator and connecting means connecting said actuator to said base whereby said base is caused to respond to operation of said actuator, said connecting means including a flexible cable through which said actuator is operative to pull said base towards said support to adopt a lower position of elevation.

2. A system according to claim 1, wherein said base includes two sides extending generally in the front and rear directions of said base, and said height adjusting means is operable to vary the relative elevations of said two sides of said base.

3. A system according to claim 1, including a slide track, and wherein said mounting means is connected to said support through said slide track whereby said base can be moved relative to said support in a forward or rearward direction.

4. A system according to claim 1, wherein said base has a front side and a rear side, and said height adjusting means is operable to adjust the elevation of one of said front and rear sides relative to the elevation of the other of said front and rear sides.

5. A system according to claim 4, including a separate actuator operable to control the position of elevation of said front and rear sides respectively.

6. A system according to claim 1, including guide means for guiding said base along a predetermined path of travel during movement between raised and lowered positions of elevation.

7. A system according to claim 6, wherein said guide means forms part of at least one mounting assembly.

8. A system according to claim 1, wherein said biasing means imposes an upward force on said base, whereby when a normal load is imposed on said base by a seat occupant said upward force is normally greater than a downward force imposed by said load.

9. A system according to claim 8, wherein said upward force is approximately double said downward force.

10. A system according to claim 1, wherein said mounting means includes at least one mounting assembly and said biasing means forms part of that assembly.

11. A system according to claim 10, including a rigid protective housing, and wherein said at least one mounting assembly is contained within said rigid protective housing.

12. A system according to claim 10, including four of said mounting assemblies, each of said mounting assemblies located at a respective corner of said base, and said biasing means includes four springs, each of said springs forming part of a respective one of said mounting assemblies.

13. A system according to claim 10, wherein said at least one mounting assembly is connected to said base through a pivot connection having its axis extending transverse of said base such that said base can tilt forwards or rearwards relative to said support.

14. A seat height adjustment system including, a support, a seat base, mounting means mounting said base on said support to permit movement of said base away from and towards said support, biasing means urging said base away from said support towards a raised position of elevation, and height adjusting means drivably connected to said base and operable to move said base towards said support against the action of said biasing means so that said base adopts a position of elevation below said raised position, said height adjusting means being operative to hold said base against movement away from said support beyond a selected position of elevation, said mounting means includes four mounting assemblies, each of said mounting assemblies is located at a respective corner of said base, and said biasing means includes four springs, each of said springs forming part of a respective one of said mounting assemblies.

15. A system according to claim 14, wherein at least one of said mounting assemblies is connected to said base through a pivot connection having its axis extending transverse of said base such that said base can tilt forwards or rearwards relative to said support.

16. A system according to claim 14, including a rigid protective housing, wherein at least one of said mounting assemblies is contained within said rigid protective housing.

17. A system according to claim 14 wherein said height adjusting means includes an actuator and connecting means connecting said actuator to said base whereby said base is caused to respond to operation of said actuator.

18. A system according to claim 17, wherein said connecting means includes a flexible cable through which said actuator is operative to pull said base towards said support to adopt a lowered position of elevation.

19. A system according to claim 17, wherein said actuator is connected to said base for movement therewith.

20. A system according to claim 17, wherein said actuator is an electric motor.

21. A seat height adjustment system including, a support, a seat base, mounting means mounting said base on said support to permit movement of said base away from and towards said support, biasing means urging said base away from said support towards a raised position of elevation, said mounting means including at least one mounting assembly and said biasing means forming part of said at least one mounting assembly, a rigid protective housing, said at least one mounting assembly being contained within said rigid protective housing, and height adjusting means drivably connected to said base and operable to move said base towards said support against the action of said biasing means so that said base adopts a position of elevation below said raised position, said height adjusting means being operative to hold said base against movement away from said support beyond a selected position of elevation.

22. A seat height adjustment system including, a support, a seat base, mounting means mounting said base on said support to permit movement of said base away from and towards said support, biasing means urging said base away from said support towards a raised position of elevation, and height adjusting means drivably connected to said base and operable to move said base towards said support against the action of said biasing means so that said base adopts a position of elevation below said raised position, said height adjusting means being operative to hold said base against movement away from said support beyond a selected position of elevation, said height adjusting means including an electric motor and connecting means connecting said electric motor to said base whereby said base is caused to respond to operation of said electric motor.

23. A system according to claim 22, wherein said connecting means includes a flexible cable through which said actuator is operative to pull said base towards said support to adopt a lowered position of elevation.

24. A seat height adjustment system including, a support, a seat base, mounting means mounting said base on said support to permit movement of said base away from and towards said support, biasing means urging said base away from said support towards a raised position of elevation, said mounting means including at least one mounting assembly and said biasing means forming part of said at least one mounting assembly, said at least one mounting assembly being connected to said base through a pivot connection having its axis extending transverse of said base such that said base can tilt forwards or rearwards relative to said support, and height adjusting means drivably connected to said base and operable to move said base towards said support against the action of said biasing means so that said base adopts a position of elevation below said raised position, said height adjusting means being operative to hold said base against movement away from said support beyond a selected position of elevation.

* * * * *

UNITED STATES PATENT AND TRADEMARK OFFICE
CERTIFICATE OF CORRECTION

PATENT NO. : 5,931,533

DATED : August 3, 1999

INVENTOR(S) : Mark Lance

It is certified that error appears in the above-identified patent and that said Letters Patent is hereby corrected as shown below:

On the title page, insert the following items:

[75] delete "Williamstown" and insert therefor --Victoria--.

[57] ABSTRACT, line 9, "Actuator" should read --The actuator--.

Column 3, line 45, delete "comers" and insert therefor --corners--.

Column 3, line 48, delete "comers" and insert therefor --corners--.

Signed and Sealed this

Fourteenth Day of March, 2000

Attest:

Q. TODD DICKINSON

*Attesting Officer*  *Commissioner of Patents and Trademarks*